(12) United States Patent
Skarping et al.

(10) Patent No.: US 10,598,529 B2
(45) Date of Patent: Mar. 24, 2020

(54) ENHANCED DIFFERENTIAL THERMAL MASS FLOW METER ASSEMBLY AND METHODS FOR MEASURING A MASS FLOW USING SAID MASS FLOW METER ASSEMBLY

(71) Applicant: PROVTAGAREN AB, Hässleholm (SE)

(72) Inventors: Gunnar Skarping, Hässleholm (SE); Marianne Dalene, Hässleholm (SE)

(73) Assignee: PROVTAGAREN AB, Hässleholm (SE)

( * ) Notice: Subject to any disclaimer, the term of this patent is extended or adjusted under 35 U.S.C. 154(b) by 0 days.

(21) Appl. No.: 14/765,999

(22) PCT Filed: Feb. 7, 2014

(86) PCT No.: PCT/SE2014/050157
§ 371 (c)(1),
(2) Date: Aug. 5, 2015

(87) PCT Pub. No.: WO2014/123481
PCT Pub. Date: Aug. 14, 2014

(65) Prior Publication Data
US 2016/0011028 A1      Jan. 14, 2016

Related U.S. Application Data
(60) Provisional application No. 61/762,358, filed on Feb. 8, 2013.

(30) Foreign Application Priority Data
Feb. 8, 2013   (SE) ...................................... 1350154

(51) Int. Cl.
*G01F 1/684*     (2006.01)
*G01F 1/696*     (2006.01)
(Continued)

(52) U.S. Cl.
CPC ............ *G01F 1/684* (2013.01); *G01F 1/6842* (2013.01); *G01F 1/6965* (2013.01); *G01F 1/6986* (2013.01); *G01F 25/0007* (2013.01)

(58) Field of Classification Search
CPC ........ G01F 1/68; G01F 1/6842; G01F 1/6845; G01F 1/6847; G01F 1/6965;
(Continued)

(56) References Cited
U.S. PATENT DOCUMENTS 4,175,438 A * 11/1979 Wenzl .................... G01K 13/02
                                                              136/224
4,542,650 A     9/1985 Renken et al.
(Continued)

FOREIGN PATENT DOCUMENTS

DE       19838859       3/1999
EP       0 943 900 A1   9/1999
(Continued)

OTHER PUBLICATIONS

Sabaté et al., "Multi-range silicon micromachined flow sensor," Science Direct, Sensors and Actuators A, 110:282-288 (2004).

*Primary Examiner* — Justin N Olamit
(74) *Attorney, Agent, or Firm* — Preti Flaherty Beliveau & Pachios LLP

(57) ABSTRACT

A differential thermal mass flow meter assembly (1) for measuring a mass flow of a gas or liquid is disclosed, wherein it comprises: a flow channel (2), in which the gas or liquid is flowing, at least two heating elements (4, 4', 4") arranged in the flow direction on the inside wall (3) of said flow channel (2), at least one thermal sensor (5) arranged in the flow direction up-stream said heating elements (4, 4', 4") on the inside wall (3) of said flow channel (2), at least one thermal sensor (6") arranged in the flow direction down-stream said heating elements (4, 4', 4") on the inside wall (3) of said flow channel (2), as well as a method of measuring (Continued)

the mass flow of a gas or liquid using said differential thermal mass flow meter assembly.

16 Claims, 8 Drawing Sheets

(51) Int. Cl.
  G01F 25/00 (2006.01)
  G01F 1/698 (2006.01)
(58) Field of Classification Search
  CPC . G01F 1/7084; G01F 1/72; G01F 1/69; G01F 1/692; G01F 1/688; G01F 1/6882; G01F 1/6884; G01F 1/6886; G01F 1/16888; G01F 25/0007
  See application file for complete search history.

(56) References Cited

U.S. PATENT DOCUMENTS

| | | | |
|---|---|---|---|
| 5,404,753 A | 4/1995 | Hecht et al. | |
| 5,698,795 A * | 12/1997 | Elliott | G01F 1/7084 |
| | | | 73/861.95 |
| 6,289,746 B1 | 9/2001 | Fu et al. | |
| 6,349,596 B1 | 2/2002 | Nakada et al. | |
| 6,631,638 B2 * | 10/2003 | James | G01F 1/6845 |
| | | | 73/204.26 |
| 6,796,172 B2 * | 9/2004 | Blakley | G01F 1/684 |
| | | | 73/204.26 |
| 6,843,110 B2 * | 1/2005 | Deane | G01F 1/363 |
| | | | 73/114.35 |
| 7,302,862 B2 * | 12/2007 | Fujiwara | G01F 1/684 |
| | | | 73/861.52 |
| 7,895,888 B2 * | 3/2011 | Hasebe | G01F 1/6845 |
| | | | 73/204.27 |
| 8,590,360 B2 * | 11/2013 | Kramer | G01F 1/698 |
| | | | 73/1.16 |
| 9,631,965 B2 * | 4/2017 | Frolov | G01F 1/698 |
| 2003/0196487 A1 | 10/2003 | Ariyoshi | |
| 2006/0005619 A1 | 1/2006 | Renninger et al. | |

FOREIGN PATENT DOCUMENTS

| | | |
|---|---|---|
| EP | 1 087 213 A2 | 3/2001 |
| JP | 10-185639 | 7/1998 |
| JP | 2000-111377 | 4/2000 |
| JP | 2002048615 | 2/2002 |
| JP | 2003240617 | 8/2003 |
| JP | 2009-103589 | 5/2009 |
| JP | 2009109284 | 5/2009 |
| JP | 2011-174876 | 9/2011 |
| JP | 2011209038 | 10/2011 |
| JP | 2012173004 | 9/2012 |
| WO | WO 01/18496 A2 | 3/2001 |
| WO | WO 2010/142999 | 12/2010 |

\* cited by examiner

ENHANCED DIFFERENTIAL THERMAL MASS FLOW METER ASSEMBLY AND METHODS FOR MEASURING A MASS FLOW USING SAID MASS FLOW METER ASSEMBLY

TECHNICAL FIELD

The present invention relates generally to an enhanced differential thermal mass flow meter assembly and to methods for measuring a mass flow using said mass flow meter assembly. More particularly, the present invention relates to an enhanced mass flow meter assembly and the methods of measuring a mass flow as defined in claim 1, and in claim 12 respectively.

BACKGROUND ART

Measuring the flow of gases and liquids through tubing or pipes is required in many application areas. The volume flow through the tubing or pipe is often what is desired to measure. Volume flow meters are however invasive, fragile and often fairly bulky, why it is usual to instead measure the mass flow using mass flow meters. Knowing the pressure and the temperature, a mass flow may be converted to a volume flow by relatively simple calculations. A usual type of mass flow meter is the differential thermal mass flow meter.

A differential thermal mass flow meter has a flow channel in which a heating element and two thermal sensors reside. One of the thermal sensors is situated up-stream compared to the heating element, the other thermal sensor down-stream. As a gas or liquid flows through the flow channel, the heater affects the thermal sensors differently, and a temperature difference between the two thermal sensors occurs. Each temperature difference corresponds to a certain flow rate for a specified gas or liquid. The problem with this setup is that long term use and contamination affects the heat transfer from the gas or liquid to the thermal sensors, as the surface properties of the sensor are changed either by having a layer of particles accumulating thereon or parts of a particle layer flaking off after calibration. This long-term wear thus makes the flow-to-temperature-relation drift, and an erroneous mass flow will be measured.

A further problem with differential mass flow meters is that the distance between the two thermal sensors and the heating element is fixed. The optimal distance between the down-stream arranged thermal sensor and the heating element varies with the mass flow, which leads to a situation in which the mass flow meter will have the highest possible accuracy for only one certain gas or liquid mass flow. A still further problem with differential mass flow meters is that rapid pulsation in the flow is hard to measure. The heat transfer from the heater to the medium (gas or liquid inside the flow channel), and then from the medium to the temperature sensor is not immediate, but is limited by the heat conductivity of the medium as well as the response time in the temperature sensors. This thermal inertia gives a low-pass filtering effect, limiting a measurable frequency of pulsation.

Thus, there is a need for an enhanced differential thermal mass flow meter with a view to overcoming the above problems of differential mass flow meters of the prior art.

SUMMARY OF THE INVENTION

It is an object of the present invention to improve the current state of the art, to solve the above problems, and to provide an improved differential thermal mass flow meter. These and other objects are achieved by a differential thermal mass flow meter assembly for measuring a mass flow of a gas or liquid flowing inside a flow channel comprising: a flow channel, at least two heating elements arranged in the flow direction on the inside wall of said flow channel, at least one thermal sensor arranged in the flow direction up-stream said heating elements on the inside wall of said flow channel, at least one thermal sensor arranged in the flow direction down-stream said heating elements on the inside wall of said flow channel.

Using multiple heating elements will make it possible to enhance the accuracy and precision of the measured mass flow and to detect errors due to wear or contamination. The heating elements are placed spaced apart in the flow direction in the flow channel. The accuracy may be enhanced by the detection and compensation for wear and deterioration. Since heat is not only conducted from the heating element to a thermal sensor by the gas, but to some extent also through the substrate that the differential mass flow meter assembly is attached to, and since the heat conduction in the substrate and in the gas are very different, the distance from the heating element may be used to detect malfunction. A first measurement may be made by using a first heating element, and a second measurement may be used by using a second heating element. If the differential mass flow meter assembly is not worn and without contamination, the calibration of the differential mass flow meter assembly will be accurate and give the same mass flow result for measurements with both heating elements. If a layer of contamination is present on the differential mass flow meter assembly or if it is worn, a difference between mass flow results will be present. This is the case when small systematic differences between the mass flow sensors or their environment e.g. the cross-section area of the flow channel or the distance between heater and temperature sensors.

The differential thermal mass flow meter assembly according to the invention may further comprise at least one thermal sensor arranged between any two neighbouring heating elements in the flow direction on the inside wall of said flow channel. By using different heating elements, the differential mass flow meter assembly may then be used as different individual differential mass flow meters. In that way a redundancy of the measurements is achieved.

The differential thermal mass flow meter assembly according to the invention may further be configured so as to comprise two or more differential thermal mass flow meter units placed on the inside wall of said flow channel neighbouring each other in the flow direction, wherein each differential thermal mass flow meter unit comprises: one heating element, at least one thermal sensor arranged up-stream said heating element and at least one thermal sensor arranged down-stream the heating element.

By increasing the number of differential thermal mass flow meter units, the redundancy of the differential thermal mass flow meter assembly will increase.

The differential thermal mass flow meter assembly according to the invention may further be configured so that at least one of the heating elements are disabled, while at least one heating element remains enabled. In that way a heating element may be used with any of the thermal sensors located down-stream of it, so that different distances between the heating element and the down-stream located thermal sensor may be used for different mass flow rates, optimizing accuracy since a pair may be chosen for which the calibration curve is the steepest. Naturally, measurements may be used using all possible pairs so that the selection of the most accurate pair may be decided after the measurement is done. The term disabled means that the heating element is present but not used by the differential thermal mass flow meter assembly. The heating element does not have to be permanently disabled, but may be re-enabled by the differential thermal mass flow meter assembly when used in a different mode or configuration.

A further aspect of the invention solving the problems of the prior art is a differential thermal mass flow meter assembly for measuring a mass flow of a gas or liquid flowing inside a flow channel comprising a flow channel, a heating element arranged on the inside wall of said flow channel, at least one thermal sensor arranged up-stream said heating element on the inside wall of said flow channel, and at least two thermal sensors arranged down-stream the heating element on the inside wall of said flow channel.

The thermal difference of each down-stream arranged thermal sensor to an up-stream arranged thermal sensor, due to heating induced by the thermal element, is pre-calibrated to a mass flow for the expected gas or liquid composition.

It is important to have the thermal sensors and the heating element on the inside of the flow channel with a view to reducing the inertia of heat transfer from the heating element to the gas or liquid flowing inside the flow channel and to facilitating the measurement of temperature in the gas or liquid passing the thermal sensors located at the flow channel wall.

With only one sensor pair, i.e., one up-stream arranged sensor and one down-stream arranged sensor, a drift away from the calibrated value cannot be detected, as it only appears when the flow has been changed. With two or more sensor pairs, i.e., at least one up-stream arranged sensor and two or more down-stream arranged sensors, differentiated by having different distances up-stream and down-stream of the heating element, the impact of long-term wear on the mass flow sensor can be detected as the wear affects the sensor pairs differently. As their individual perceived flow rates deviate from each other, this is detected as the above-mentioned drift, and can therefore be compensated for.

In some embodiments, the differential thermal mass flow meter assembly or each differential thermal mass flow meter unit preferably comprises three or more thermal sensors arranged down-stream the heating element on the inside wall of said flow channel.

The differential thermal mass flow meter assembly or each differential thermal mass flow meter unit preferably has down-stream arranged thermal sensors placed at different distances from the thermal element along the inside wall of the flow channel so that a mass flow measurement can be made at different physical positions and thereby unexpected deviations between measurements can be detected. A further advantage is that a higher precision of the measurements can be obtained via an average value of several measurement positions. If depositions of dirt particles on the differential thermal mass flow meter assembly is uneven the accuracy of the measured mass flow, when taking an average of all measured values of mass flow, is increased compared to if only one thermal sensor pair would have been at hand (as is the case in prior art differential thermal mass flow meters). An average value from multiple measurements at different locations will then give an increased accuracy as compared to measurements from a single location.

According to a further aspect of the differential thermal mass flow meter assembly the thermal sensors arranged down-stream the first heating element (seen in the flow direction) are not equidistantly placed along the inside wall of the flow channel. This may also apply to the up-stream arranged thermal sensors, if more than one exists. Placing the thermal sensors according to a logarithmic scale matching the thermal difference per distance from the heating element, fewer sensors can be used without sacrificing resolution in term of choosing an optimal distance to the thermal sensor from the heating element for the current flow. The optimal distance is where the mass flow calibration curve for that sensor is the steepest, i.e. the most sensitive. Since the temperature difference per distance from the heating element is greatest near the heating element, the thermal sensors will be placed closer together near the heating element and further and further apart at greater distances from the heating element. Using fewer sensors will reduce the amount of data to analyze and store and reduce the costs of the differential mass flow sensor.

In some embodiments, it is further preferred that the sensors of the differential thermal mass flow meter assembly are covered by a coating. In these embodiments, some or all of the thermal sensors may be coated; preferably all sensors will be coated. The coating is preferably thin, e.g. in the range from 1 µm to 2 mm. All components of the mass flow meter that are placed on the inside of the flow channel wall, i.e. all of the thermal sensors both up-stream arranged and down-stream arranged, as well as the thermal element, are preferably covered by the coating. The coating may e.g. be a resin coating, lacquer, glass, ceramic, or silicon carbide (SiC) coating. The coating will "fill up" between the components so that they no longer can cause any turbulence in the flow of the gas or liquid in the flow channel. The flow will thus be kept more laminar when the components are not affecting the flow. The components will also be protected from physical wear from the flow passing by them. Dirt particles will not be able to gather at the component surfaces as they are no longer protruding from the wall surface.

As a flow which is as laminar as possible is desired for the measurements with the mass flow meter, it is preferred that a laminar flow element is positioned up-stream the mass flow meter attached to an up-stream inlet of the flow channel. In a further embodiment of the differential thermal mass flow meter assembly according to the invention, said flow channel is diverging so that the cross-section perpendicular to the flow direction increases or decreases along the flow direction. The flow velocity of the gas in the flow channel will thus be proportionally smaller or larger with the enlargement of the flow channel cross-section. This will affect the calibration curve for each thermal sensor down-stream a heating element. In the embodiment where the differential thermal mass flow meter assembly is built up by identical differential thermal mass flow meter units, each unit will then have different operational areas where they are most accurate and they will thus also be affected differently by homogenous wear or contamination.

According to one aspect of the invention it is further preferred that the flow channel of said pump assembly has a cross-section at each down-stream arranged temperature sensor that is optimal for a flow rate that is optimal for the distance to the heating element. The optimal cross section of the flow channel varies with the flow, as does also the optimal distance for the thermal sensors to the heating element.

The coating further preferably has a repellant surface structure so that particles will not as easily deposit on the surface. The structure of the surface is preferably very smooth without recesses or projections where particles could gather.

The differential thermal mass flow meter assembly further preferably comprises a pressure sensor for measuring the pressure close to the thermal sensors in said flow channel. The pressure sensor measurement may be used for converting the measured mass flow to a volume flow by calculations using the ideal gas law.

A further aspect of the present invention is a method of measuring a mass flow of a gas or liquid using a differential thermal mass flow meter assembly as described above, comprising the steps of measuring a reference temperature of said gas or liquid using said at least one up-stream arranged thermal sensor, heating said gas or liquid using said heating element, measuring the temperature of said gas or liquid at one or each down-stream arranged thermal sensor, calculating a mass flow at each down-stream arranged thermal sensor using the temperature difference between the temperature at each down-stream arranged thermal sensor and said reference temperature and comparing the temperature difference to a predetermined calibration set, and estimating or determining any turbulence or pulsation on the basis of measured differences between individual mass flow measurement results of the respective down-stream arranged thermal sensors.

By doing simultaneous measurements of the mass flow at different positions along the flow channel, turbulence or pulsation may be detected. Momentarily differences in detected mass flow between different measurement positions (i.e. at different down-stream arranged thermal sensors) along the flow channel indicate a fluctuation of the gas or liquid flow. By further estimating any turbulence or pulsation in combination with each of the up-stream arranged thermal sensors as well as each of the down-stream arranged thermal sensors, the number of different possible differential thermal measurement sensor pairs may be multiplied by the number of up-stream arranged thermal sensors. The measurement precision, the measurement accuracy and also the ability to detect pulsation will increase. This, however, requires individual thermal measurements at each thermal sensor, which may not always be feasible. In some situations it is desirable to measure the voltage directly between an up-stream arranged thermal sensor and a down-stream arranged thermal sensor. In that case the thermal sensor pairs will be predetermined and static.

Determined or estimated pulsation may also be compensated for in the output signal of the measured mass flow of the differential thermal mass flow meter assembly. Especially if the pulsation is periodic, which often is the case for, e.g. many pumps, the determined turbulence or pulsation may be subtracted from the signal and thereby cancelled out from the output signal. If non-systematic pulsation can be determined, i.e. be determined to be a disturbance of the flow of interest, that pulsation may also be compensated for in the output signal in the same way. To be able to detect pulsation or turbulence, the sampling frequency of the signal from the differential thermal mass flow meter assembly has to be faster or preferably much faster than the frequencies in the pulsation or turbulence that is to be detected.

A further aspect of the present invention is a method of measuring a mass flow of a gas or liquid using a differential thermal mass flow meter assembly as described above, comprising the steps of measuring a reference temperature of said gas or liquid using said at least one up-stream arranged thermal sensor, heating said gas or liquid using said heating element, measuring the temperature of said gas or liquid at one or each down-stream arranged thermal sensor, calculating a mass flow at each down-stream arranged thermal sensor using the temperature difference between the temperature at each down-stream arranged thermal sensor and said reference temperature and comparing the temperature difference to a predetermined calibration set, and detecting any systematical differences between individual mass flow measurement results of respective down-stream arranged thermal sensors or detecting any systematical differences between individual differential mass flow meter units with a view to estimating any presence of deposits on the thermal sensors, or any presence of deposits on or damage to the coating covering the thermal sensors.

Differences in detected mass flow between different measurement positions (i.e. at different down-stream arranged thermal sensors) along the flow channel that occur for every measurement occasion indicate a systematic measurement error due to something statically disturbing the measurements. Static disturbance of the measurements affecting the different measurement positions differently are likely due to deposits of particles or damages to the coating layer, if the mass flow meter components are provided with a coating. Deposits of dirt particles on a mass flow meter thermal sensor will reduce that thermal sensor's sensitivity, resulting in a measurement error. Any damage in the coating covering a thermal sensor will make it more sensitive to the flow temperature, which will not match the calibration, also resulting in a measurement error. If the sensors don't have a coating, they may with time gather a deposit layer of dirt particles, which are sometimes present when calibrating the mass flow meter. These deposits may flake off and change the sensitivity of the thermal sensors. Also such errors will be detected by the presented method.

If systematic errors are detected, i.e. that one thermal sensor has an offset in the measured values compared to what it is expected to show, as derived from the surrounding thermal sensors, the calibration relating to that thermal sensor can be adjusted by the detected error offset value and thereby the error can be corrected. The mass flow meter may also provide an output signal to alert a user that a systematic error has arisen and that the mass flow meter needs service.

Systematical differences between individual mass flow measurement results of respective down-stream arranged and up-stream arranged thermal sensor pairs that are detected will further increase the possibilities of detecting deposits covering the mass flow meter components or damages of the coating on the mass flow meter components. As the number of different possible differential thermal measurement sensor pairs are multiplied by the number of up-stream arranged thermal sensors, the ability to detect malfunction due to deposits and/or a damaged coating is multiplied by the number of possible thermal sensor pairs that can be used to detect systematical measurement errors.

A further aspect of the present invention is a method of measuring a mass flow of a gas or liquid using a differential thermal mass flow meter assembly as described above, comprising the steps of: measuring a reference temperature of said gas or liquid using said at least one up-stream arranged thermal sensor, heating said gas or liquid using said heating element, measuring the temperature of said gas or liquid at one or each down-stream arranged thermal sensor, calculating a mass flow at each down-stream arranged thermal sensor using the temperature difference between the temperature at each down-stream arranged thermal sensor and said reference temperature and comparing the temperature difference to a predetermined calibration set, and choosing the down-stream arranged thermal sensor that is to be used for a mass flow measurement together with said at least one up-stream arranged thermal sensor dependent on the value of the mass flow.

The optimal distance between the heating element and the down-stream arranged thermal sensor differ for different flows. A measurement using the above-mentioned mass flow meter may further comprise the steps of weighting the signals corresponding to different thermal sensor pairs differently so as to weight the signal of sensors that is closer to the optimal position for said flow heavier than the sensors further away from said optimal position, and calculating the resulting flow by an average value of all sensor pairs, wherein said weighing is multiplied to each individual mass flow measurement. The measurement result may also be limited to only relying on the down-stream arranged thermal sensor being closest to the optimal position for the detected flow. The up-stream arranged thermal sensor that is to be used for a mass flow measurement together with the chosen down-stream arranged thermal sensor may also be chosen dependent on the value of the mass flow with a view to further increasing the measurement precision and accuracy.

The method above may further comprise the steps of weighting the signals differently so as to weight the signal of sensors that is closer to the optimal position for said flow heavier than the sensors further away from said optimal position, and calculating the resulting flow by an average value of all sensor pairs, wherein said weighing is multiplied to each individual mass flow measurement.

According to a further embodiment of the present invention a method of measuring a mass flow of a gas or liquid using a differential thermal mass flow meter assembly according to the above is presented, comprising the steps of: measuring an individual mass flow at each differential thermal mass flow meter unit, comparing said measured mass flows with a view to detecting malfunction of any of the differential thermal mass flow meter units.

According to a still further embodiment of the present invention a method of measuring a mass flow of a gas or liquid using a differential thermal mass flow meter assembly according to above is presented, comprising the steps of: measuring a reference temperature of said gas or liquid using said at least one up-stream arranged thermal sensor, heating said gas or liquid using at least two heating elements, each heating element being fed with a predetermined electrical power, making a first set of measurements of the temperature of said gas or liquid at one or each down-stream arranged thermal sensors, adjusting the predetermined electrical power to each heating element, making a second set of measurements of the temperature of said gas or liquid at one or each down-stream arranged thermal sensors, calculating a first and second set of mass flow values at each down-stream arranged thermal sensor for said first and said second set of measurements using the temperature difference between the temperature at each down-stream arranged thermal sensor and said reference temperature and comparing the temperature difference to a predetermined calibration set, and comparing said first and second set of mass flow values with a view of detecting wear or contamination of the heating elements.

The thermal elements may also be used at different power ratings to adjust the heating of the gas passing the differential thermal mass flow meter assembly with a view to optimizing the sensitivity of the downstream arranged thermal sensors.

According to a still further embodiment of the present invention a method of measuring a mass flow of a gas or liquid using a differential thermal mass flow meter assembly is presented comprising the steps of: pulsing the power to the heating element, comparing the rise and fall time for the temperature difference between an up-stream sensor and a down-stream sensor with the view to detecting malfunction of mass flow meter assembly or mass flow meter units. Pulsing of the heating elements may naturally be made using one or all of the heating elements, if more than one heating element is enabled.

As presented above, the problems of the prior art are thus addressed by the above presented differential thermal mass flow meter assembly, presenting a differential thermal mass flow meter that can detect malfunction due to wear and contamination and that may be more accurate than the prior art differential thermal mass flow meters.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1A:
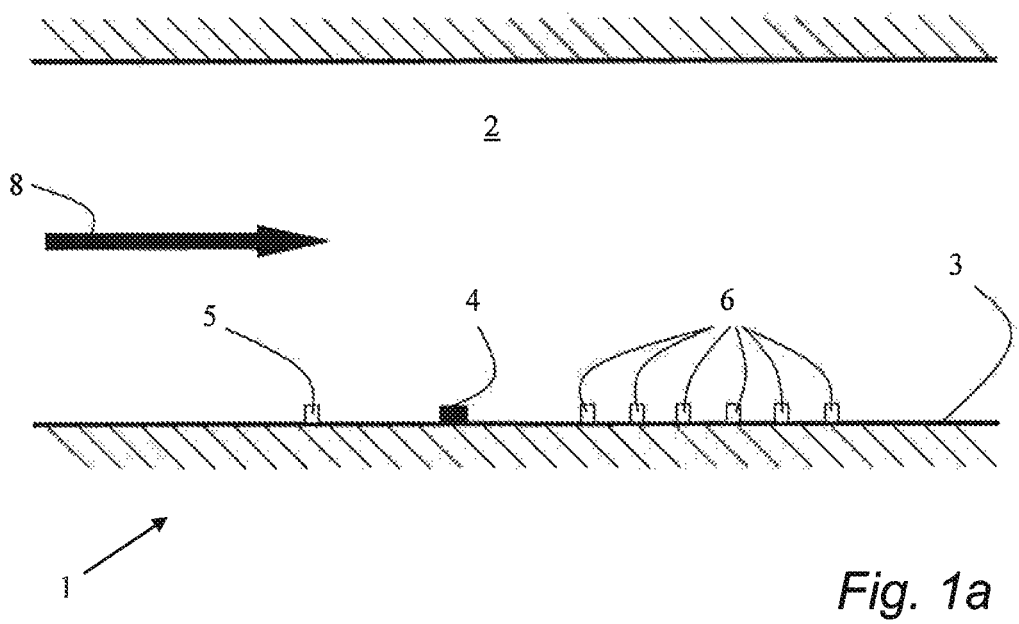
FIG. 1a is a schematic view of a differential thermal mass flow meter assembly according to the invention having multiple down-stream arranged thermal sensors.

FIG. 1a is a schematic view of a differential thermal mass flow meter assembly 1 according to the invention. The differential thermal mass flow meter assembly has multiple down-stream arranged thermal sensors 6, arranged on the inside wall 3 of a flow channel 2 of the differential thermal mass flow meter assembly 1. The flow direction of the gas or liquid in the flow channel 2 is marked by the arrow 8. An up-stream arranged thermal sensor 5 is placed up-stream of a mid-stream arranged heating element 4.

Figure 1B:
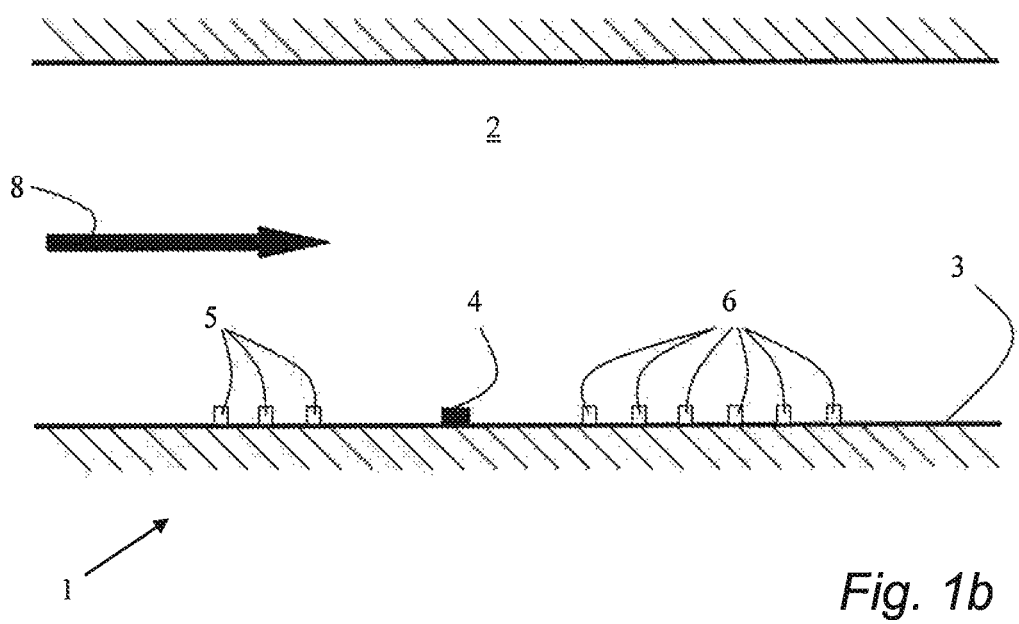
FIG. 1b is a schematic view of a differential thermal mass flow meter assembly according to the invention having multiple down-stream arranged thermal sensors and multiple up-stream arranged thermal sensors.

FIG. 1*b* is a schematic view of a differential thermal mass flow meter assembly 1 according to the invention having multiple down-stream arranged thermal sensors 6, and also multiple up-stream arranged thermal sensors 5. The number of possible pairs of thermal sensor pairs (a pair being one up-stream arranged sensors 5 and one down-stream arranged sensor 6) thus increases with the number of possible thermal sensor pairs to use for measuring a temperature difference.

In one embodiment of the invention the temperature difference between an up-stream arranged thermal sensors 5 and a down-stream arranged thermal sensor 6 is calculated from a measurement of the voltage between the thermal sensors 5, 6 in the pair. In this embodiment the number of up-stream arranged thermal sensor 5 and down-stream arranged sensors 6 have to be equal. In the layout of FIG. 1*a* this means that the up-stream sensor 5 has to be composed of multiple thermal sensors at the same location.

Figure 1C:
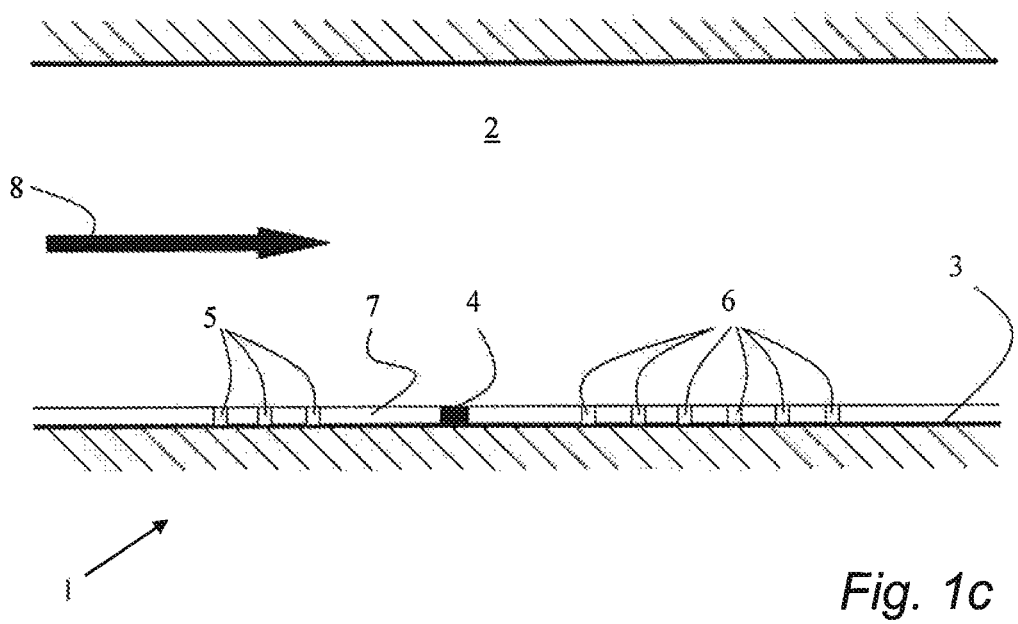
FIG. 1c is a schematic view of a differential thermal mass flow meter assembly according to FIG. 1b having a coating covering the components of the differential thermal mass flow meter assembly.

FIG. 1*c* is a schematic view of a differential thermal mass flow meter assembly 1 having a coating 7 covering the components 4, 5, 6 of the differential thermal mass flow meter assembly 1.

Figure 1D:
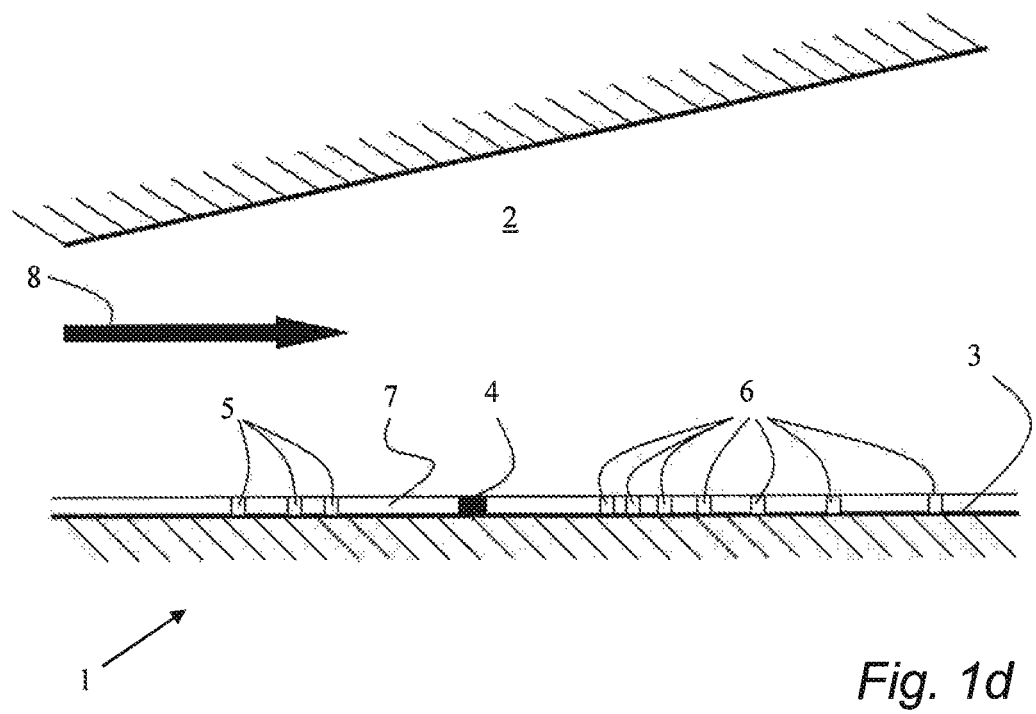
FIG. 1d is a schematic view of a differential thermal mass flow meter assembly according to FIG. 1c where the thermal sensors are non-equidistantly arranged in the flow direction and where the cross-section perpendicular to the flow direction increases along the flow direction.

FIG. 1*d* is a schematic view of a differential thermal mass flow meter assembly where the thermal sensors are non-equidistantly arranged in the flow direction. As the heat from the heating 4 element conducted through the flowing gas or liquid will decay exponential to the distance from the heating element 4, an equal distribution of the thermal sensors along the flow channel as in FIG. 1*c* will give fewer options of choosing thermal sensor pairs close to the heating element, when viewed in terms of the temperature transient from the heating element 4. A denser distribution of thermal sensors close to the heating element 4 as in FIG. 1*d*, will give a more even distribution of the thermal sensors when viewing in terms of the temperature transient from the heating element.

Figure 2:
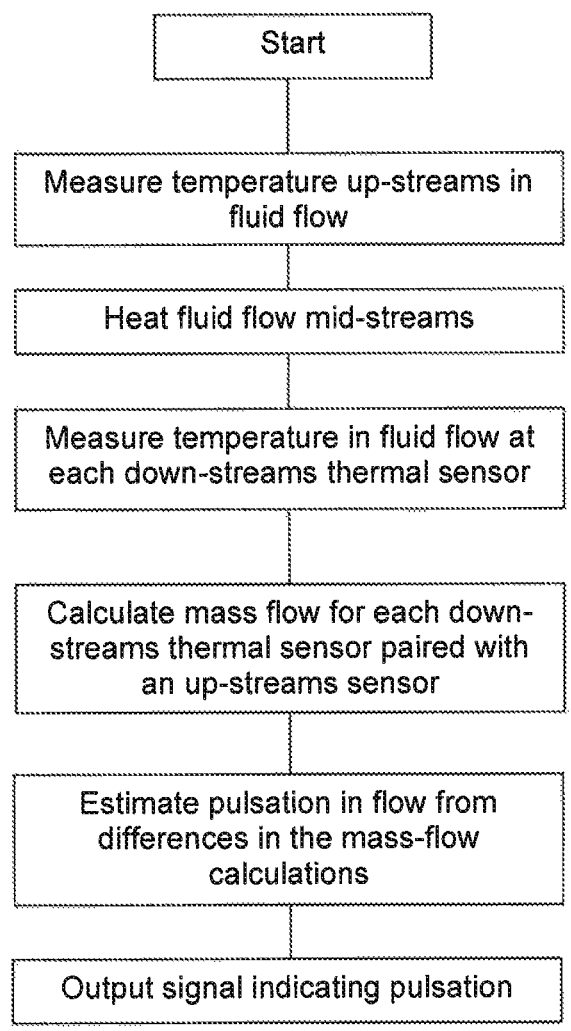
FIG. 2 is a flow chart presenting how to estimate turbulence using the differential thermal mass flow meter assembly according to the present invention.

FIG. 2 is a flow chart presenting how to estimate turbulence using the presented differential mass flow meter. The method utilizes a differential thermal mass flow meter assembly according to any one of FIG. 1*a*-FIG. 1*d*. The method of using the mass flow meter 1 starts by measuring a reference temperature of the gas or liquid flow using the up-stream arranged thermal sensors 5. The gas or liquid flow will then flow by the heating element 4, which absorbs heat. The conduction of heat from the heating element 4 to the gas or liquid is a relatively slow process and will therefore depend on the gas or liquid flow velocity which is proportional to the mass flow. The temperature of the flowing gas or liquid is then measured at a down-stream arranged thermal sensor 6 where the temperature increase of the gas or liquid, i.e. the difference between the down-stream arranged thermal sensor 5 and the up-stream arranged thermal sensor, is calculated. This is done for each of the down-stream arranged thermal sensors 6 in combination with an up-stream sensor 5. Each sensor pair is pre-calibrated to a mass flow, i.e. a relationship of a mass flow as a function of a measured temperature difference is at hand for each sensor pair. The mass flow for each sensor pair can thus be measured. As long as the calibration is correct and the flow is laminar, all sensor pairs should give the same mass flow. Deviations are noted as fluctuations in the flow and are presented to other equipment as an output signal representing the pulsation in the gas or liquid flow.

By sampling temperature difference with sufficiently high sample rate, the pulsation can estimated. With a periodic pulse pattern, it can be characterized and compensated for. Thus it is possible to measure a pulsating flow.

Figure 3:
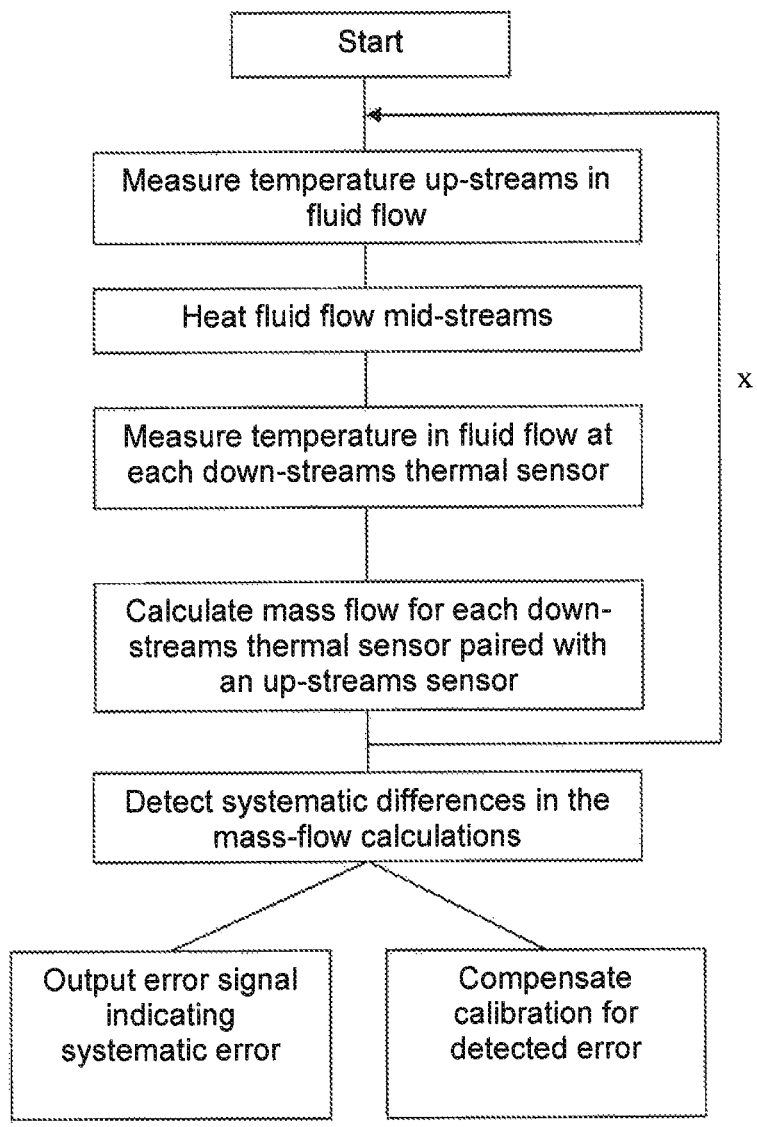
FIG. 3 is a flow chart presenting how to detect and correct systematic errors using the differential thermal mass flow meter assembly according to the present invention.

FIG. 3 is a flow chart presenting a further aspect of the present invention regarding a method of how to detect and correct systematic errors using the presented differential mass flow meter. The method utilizes a differential thermal mass flow meter assembly according to any one of FIG. 1*a*-FIG. 1*d*. The method of using the mass flow meter 1 starts by measuring a reference temperature of the flowing gas or liquid using the up-stream arranged thermal sensors 5. The gas or liquid flow will then flow by the heating element 4, which absorbs heat. The temperature of the gas or liquid flow is then measured at a down-stream arranged thermal sensor where and the temperature increase, i.e. the difference between the down-stream arranged thermal sensor 6 and the up-stream arranged thermal sensor 5, is calculated. This is done for each of the down-stream arranged thermal sensors 6 in combination with an up-stream sensor 5. Each mass flow measurement result is stored in a memory, and the method is started from the beginning producing yet a mass flow measurement result for each thermal sensor pair. This is repeated a pre-determined number of times (x) and the values are stored separately in the memory. If a thermal sensor pair systematically produces results that deviate from the average mass flow value, an output signal is produced indicating a systematic error of the differential thermal mass flow meter assembly, probably due to damage of or deposits of particles on the mass flow meter components. The differential mass flow meter can also optionally compensate for the systematic error by offsetting the calibration function of that thermal sensor pair so that the sensor pair again measures the same mass flow as the average value derived from all thermal sensor pairs.

Figure 4:
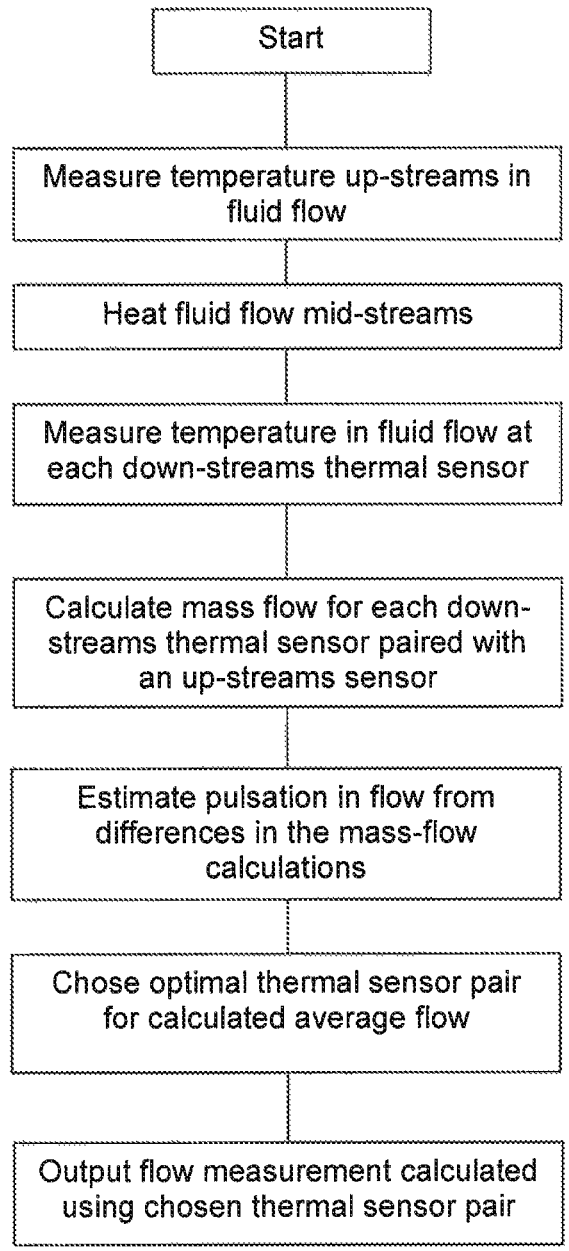
FIG. 4 is a flow chart presenting how to choose the optimal thermal sensor pair for an optimal mass flow measurement using the presented differential thermal mass flow meter assembly according to the present invention.

FIG. 4 is a flow chart presenting how to choose the optimal thermal sensor pair for an optimal mass flow measurement using the presented differential mass flow meter. The method utilizes a differential thermal mass flow meter assembly according to any one of FIG. 1*a*-FIG. 1*d*. The method of using the mass flow meter 1 starts by measuring a reference temperature of the flowing gas or liquid using the up-stream arranged thermal sensors 5. The gas or liquid flow will then flow by the heating element 4, which absorbs heat. The temperature of the gas or liquid flow is then measured at a down-stream arranged thermal sensor 6 where the temperature increase of the gas or liquid, i.e. the difference between the down-stream arranged thermal sensor 6 and the up-stream arranged thermal sensor 5, is calculated. This is done for each of the down-stream arranged thermal sensors in combination with an up-stream sensor. From the average mass flow value, the optimal thermal sensor pair can be determined. The differential thermal mass flow meter assembly may then adapt a mode where only the optimally positioned thermal sensor pair may be used for mass flow measurements for increased accuracy of the measurements. Optionally the values from the different thermal sensor pairs may be weighted when calculating an average mass flow value by how close they are to the optimal position for the measured mass flow, where a sensor pair having a closer position has a higher weight than a sensor pair having a position further away from the optimal position. To increase the precision of measurement results, a floating average over a number of successive measurements may be used. The mass flow measurement result is then delivered from the mass flow meter via an output signal representing the mass flow.

Figure 5:
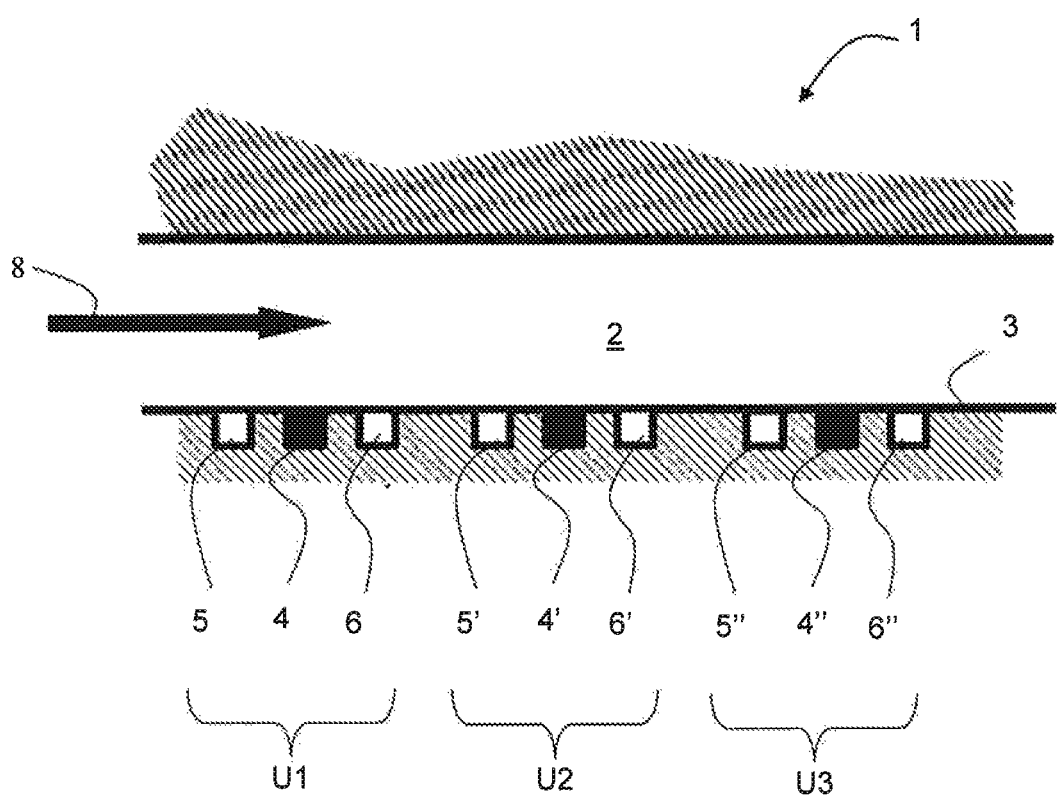
FIG. 5 is a schematic view of a differential thermal mass flow meter assembly according to the present invention where three differential thermal mass flow meter units are present.

FIG. 5 is a schematic view of a differential thermal mass flow meter assembly according to the present invention where three differential thermal mass flow meter units U1, U2, U3 are present. Each differential thermal mass flow meter unit U1, U2, U3 has at least one thermal sensor 5, 5', 5" up-stream of its unit's heating element 4, 4', 4" and at least one thermal sensor 6, 6', 6" down-stream of its unit's heating element 4, 4', 4".

Figure 6A:
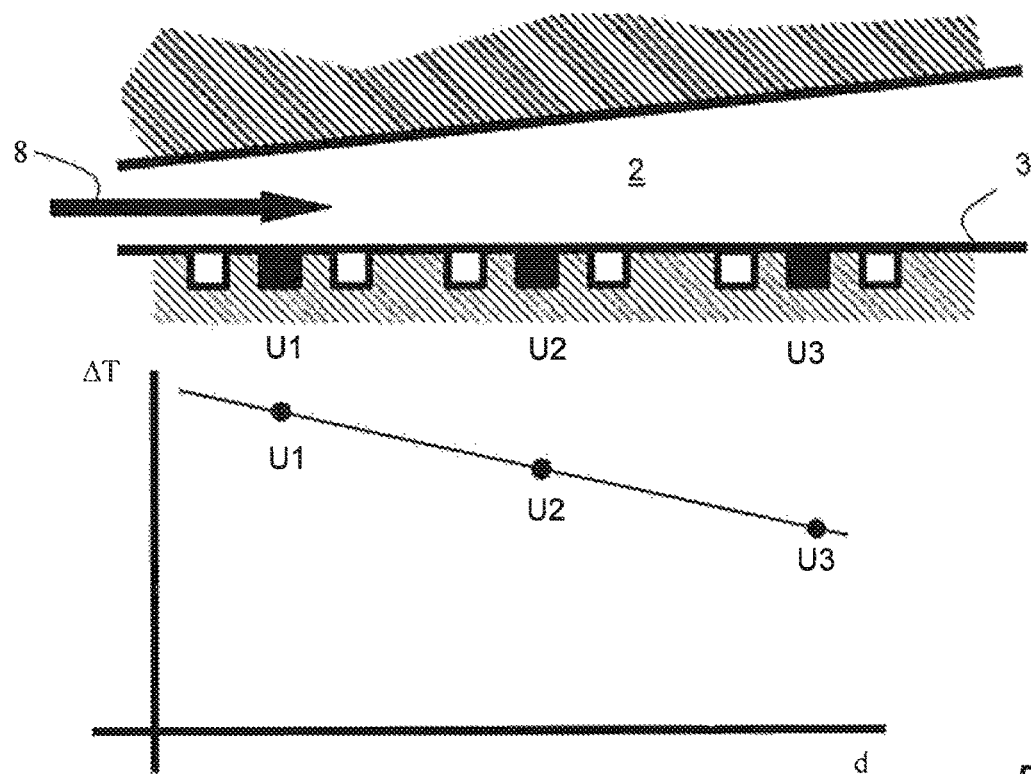
FIG. 6a is a schematic view of a differential thermal mass flow meter assembly as in FIG. 5, where the flow channel is diverging so as to reduce the velocity of the gas along the flow direction. The temperature difference ($\Delta T$) between the thermal sensors of each differential thermal mass flow meter unit is shown in a diagram as a function of the distance in the flow direction.

FIG. 6a is a schematic view of a differential thermal mass flow meter assembly as in FIG. 5, where the flow channel is diverging so as to reduce the velocity of the gas along the flow direction. The temperature difference (ΔT) between the thermal sensors of each differential thermal mass flow meter unit is shown in a diagram as a function of the distance d in the flow direction. Since the flow channel cross-section is increasing in FIG. 6, the velocity of the gas or liquid of the flow channel 2 will decrease proportionally to the increase of the cross-sectional area.

Figure 6B:
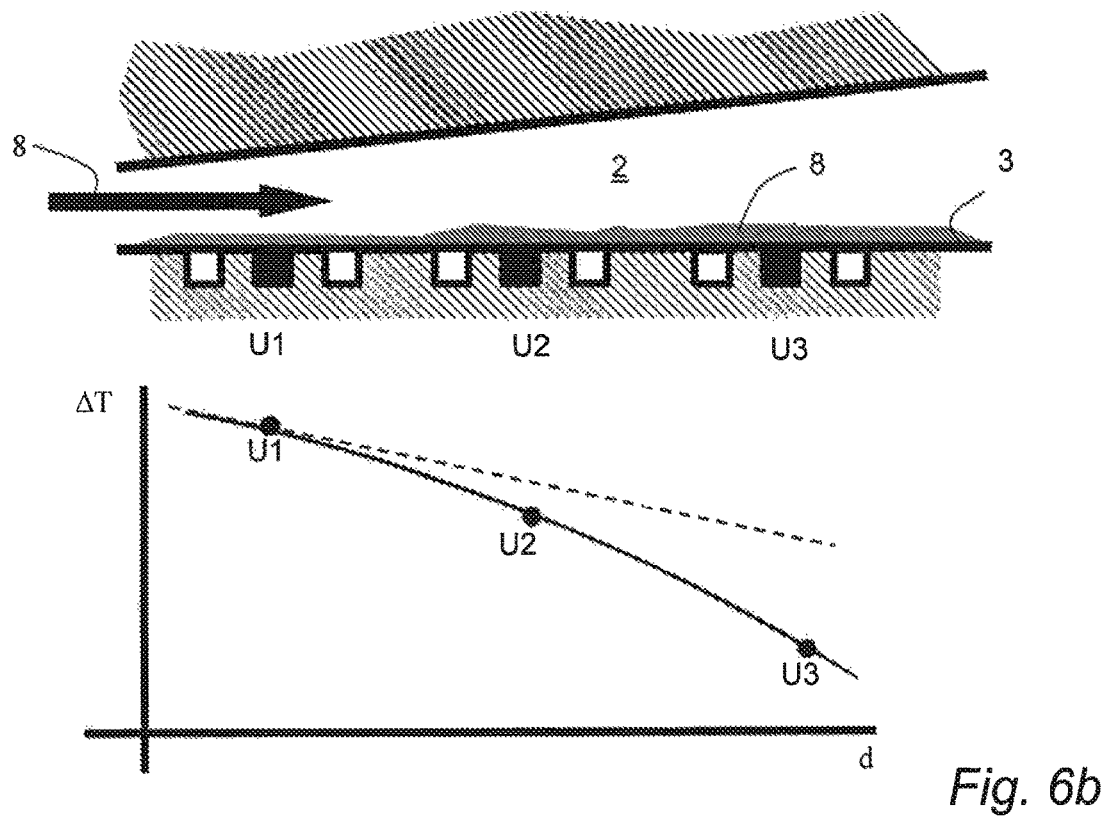
FIG. 6b is a schematic view of a differential thermal mass flow meter assembly as in FIG. 6a, where a layer of contamination is present on the differential thermal mass flow meter assembly. The temperature difference ($\Delta T$) between the thermal sensors of each differential thermal mass flow meter unit is shown in a diagram as a function of distance in the flow direction.

FIG. 6b is a schematic view of a differential thermal mass flow meter assembly as in FIG. 6a, where a layer of contamination 8 is present on the differential thermal mass flow meter assembly. The temperature difference ΔT between the thermal sensors of each differential thermal mass flow meter unit is shown in a diagram as a function of the distance d in the flow direction.

Putting several differential thermal mass flow meter units U1, U2, U3 in series inside the flow channel 2 as in FIG. 5 may give certain advantages such as better reliability and redundancy. The wear or contamination of the differential thermal mass flow meter units U1, U2, U3 can however be expected to be fairly homogeneous, which will result in the same measurement error in all sensors.

By placing the differential thermal mass flow meter units U1, U2, U3 inside the flow channel 2 at places with different cross-section areas as in FIG. 6a and FIG. 6b, the same flow will result in different velocity over individual differential thermal mass flow meter units U1, U2, U3. Each differential thermal mass flow meter unit U1, U2, U3 will require its own conversion algorithm to interpret the temperature measured at the thermal sensor difference to a flow value.

Assuming a homogeneous wear and contamination, this will affect the readout for each differential thermal mass flow meter unit U1, U2, U3 differently, since the relationship between heat conducted via the gas or liquid and the heat conducted by the flow channel wall will change with the contamination. With an algorithm examining the difference in deviation between the differential thermal mass flow meter units U1, U2, U3, the impact the wear or contamination has on the measurement can be estimated.

It is understood that the same detection of malfunction as shown with reference to FIGS. 6a and 6b could be achieved by a flow channel 2 having a decreasing cross section. The curves in the diagrams would then naturally be inversed. A further embodiment of the invention that may be used with any of the differential thermal mass flow meter assemblies of FIGS. 5-6b is to alter and control the power applied to the individual heating elements 4, 4', 4".

Changing the power to the heating element 4, 4', 4" will change its heat. The temperature difference sensed by the temperature sensors 6, 6', 6" is related to the heat dissipated from the heating element. With only one differential thermal mass flow meter unit, this change in temperature difference could as well be interpreted as a change in flow. With additional differential thermal mass flow meter units present, whose heating elements 4, 4', 4" are kept at a stable power, the actual flow is sensed, while the impact on temperature difference of alternating the heating element power can be isolated and estimated.

A further possibility with controlling the heating elements 4, 4', 4" in this differential thermal mass flow meter unit array is to select one heating element 4, 4', 4" as active, while inactivating other heating elements 4, 4', 4", only using the temperature sensors 6, 6', 6" inside the differential thermal mass flow meter units with inactive heater.

Figure 7:
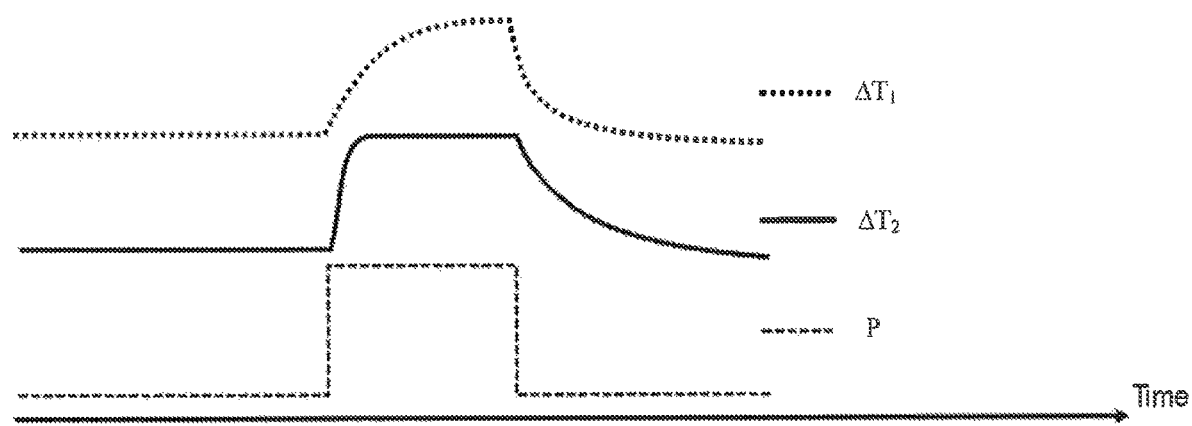
FIG. 7. is a diagram showing the different thermal response when pulsing the heating element.

A further possibility is to let one or several differential thermal mass flow meter units verify that a stable flow is held while activating the heater in another flow sensor with a pulse see FIG. 7. $T_1$ is a measured temperature difference at a high flow and $T_2$ is a measured temperature difference at a low flow. P is the heating power. The temperature step response measured by adjacent temperature sensors is estimating how the flow is affecting the temperature. This can also give an indication of flow sensor contamination or wear.

Depending on flow rate the rising edge of temperature difference will be flatter for a higher flow, while the falling edge will be steeper. A contamination or wear may change this behavior given a stable flow.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. A differential thermal mass flow meter assembly for measuring a mass flow of a gas or liquid comprising:
    a flow channel, in which the gas or liquid may flow in a flow direction,
    at least two heating elements arranged in the flow direction on an inside wall of said flow channel, wherein the at least two heating elements are configured to heat the gas or liquid and wherein each of the at least two heating elements is configured to be individually controlled,
    at least one thermal sensor arranged in the flow direction up-stream said heating elements on the inside wall of said flow channel,
    at least one thermal sensor arranged in the flow direction down-stream said heating elements on the inside wall of said flow channel, and
    at least one thermal sensor arranged between any two sequential ones of said at least two heating elements in the flow direction on the inside wall of said flow channel,
    wherein said flow channel is diverging in such a way that a separate cross-section perpendicular to the flow direction increases or decreases along the flow direction.

2. The differential thermal mass flow meter assembly according to claim 1, wherein said assembly comprises two or more differential thermal mass flow meter units placed on the inside wall of said flow channel proximate each other in the flow direction,
    wherein each differential thermal mass flow meter unit comprising: one heating element, at least one thermal sensor arranged up-stream said heating element and at least one thermal sensor arranged down-stream the heating element.

3. A method of measuring a mass flow of a gas or liquid using a differential thermal mass flow meter assembly according to claim 2, comprising the steps of:

measuring an individual mass flow at each differential thermal mass flow meter unit, comparing said measured mass flows to detect malfunction of any one of the differential thermal mass flow meter units.

4. The differential thermal mass flow meter assembly according to claim 1, comprising two or more thermal sensors arranged down-stream said heating elements in the flow direction on the inside wall of said flow channel.

5. The differential thermal mass flow meter assembly according to claim 4, wherein the at least one thermal sensor arranged in the flow direction up-stream said heating elements and said at least one thermal sensor arranged in the flow direction downstream said heating elements are not equidistantly placed along the inside wall of the flow channel.

6. The differential thermal mass flow meter assembly according to claim 1, wherein said flow channel has a cross-section at each of the at least one thermal sensor arranged in the flow direction down-stream said heating elements.

7. The differential thermal mass flow meter assembly according to claim 1, wherein at least one of the at least two heating elements, the at least one thermal sensor arranged in the flow direction up-stream said heating elements, and the at least one thermal sensor arranged in the flow direction down-stream said heating elements is covered by a coating, wherein the coating is a resin, a lacquer coating, glass, a ceramic, or SiC.

8. The differential thermal mass flow meter assembly according to claim 7, wherein the coating has a repellant surface structure.

9. A method of measuring a mass flow of a gas or liquid using a differential thermal mass flow meter assembly according to claim 1, comprising the steps of:

measuring a reference temperature of said gas or liquid using said at least one up-stream arranged thermal sensor, heating said gas or liquid using the at least one heating element, measuring the temperature of said gas or liquid at one or each down-stream arranged thermal sensor, calculating a mass flow at each down-stream arranged thermal sensor using the temperature difference between the temperature at each down-stream arranged thermal sensor and said reference temperature and comparing the temperature difference to a predetermined calibration set, and determining any turbulence or pulsation in the gas or liquid flow on the basis of measured differences between individual mass flow measurement results of the respective down-stream arranged thermal sensors.

10. The method according to claim 9, comprising the further step of compensating the output signal of the measured mass flow for said determined turbulence or pulsation.

11. A method of measuring a mass flow of a gas or liquid using a differential thermal mass flow meter according to claim 1, comprising the steps of:

measuring a reference temperature of said gas or liquid using said at least one up-stream arranged thermal sensor, heating said gas or liquid using at least one of said heating elements, measuring the temperature of said gas or liquid at one or each down-stream arranged thermal sensor, calculating a mass flow at each down-stream arranged thermal sensor using the temperature difference between the temperature at each down-stream arranged thermal sensor and said reference temperature and comparing the temperature difference to a predetermined calibration set, and detecting any systematical differences between individual mass flow measurement results of respective down-stream arranged thermal sensors or detecting any systematical differences between individual differential thermal mass flow meter units to estimate any presence of deposits on the thermal sensors, or any presence of deposits on or damage to the coating covering the thermal sensors.

12. The method according to claim 11, wherein any systematical differences between individual mass flow measurement results of respective down-stream arranged and up-stream arranged thermal sensor pairs are detected.

13. A method of measuring a mass flow of a gas or liquid using a differential thermal mass flow meter according to claim 1, comprising the steps of:

measuring a reference temperature of said gas or liquid using an at least one up-stream arranged thermal sensor, heating said gas or liquid using at least one of said heating elements, measuring the temperature of said gas or liquid at one or each down-stream arranged thermal sensor, calculating a mass flow at each down-stream arranged thermal sensor using the temperature difference between the temperature at each down-stream arranged thermal sensor and said reference temperature and comparing the temperature difference to a predetermined calibration set, and choosing the down-stream arranged thermal sensor that is to be used for a mass flow measurement together with said at least one up-stream arranged thermal sensor dependent on a value of the mass flow.

14. The method according to claim 13, further comprising the step of choosing the up-stream arranged thermal sensor that is to be used for a mass flow measurement together with the chosen down-stream arranged thermal sensor dependent on the value of the mass flow.

15. The method according to claim 13, further comprising the steps of:

weighting the signals corresponding to different thermal sensor differently so as to weight the signal of sensors that is closer to the optimal position for said flow heavier than the sensors further away from said optimal position, and calculating the resulting flow by an average value of all sensor pairs, wherein said weighing is multiplied to each individual mass flow measurement.

16. A method of measuring a mass flow of a gas or liquid using a differential thermal mass flow meter assembly for measuring a mass flow of a gas or liquid, the differential thermal mass flow meter assembly having: a flow channel, in which the gas or liquid may flow in a flow direction; at least two individually controllable heating elements arranged in the flow direction on an inside wall of said flow channel; at least one thermal sensor arranged in the flow direction up-stream said heating elements on the inside wall of said flow channel; at least one thermal sensor arranged in the flow direction down-stream said heating elements on the inside wall of said flow channel; and at least one thermal sensor arranged between any two sequential ones of said at least two heating elements in the flow direction on the inside wall of said flow channel, wherein said flow channel is diverging in such a way that a separate cross-section perpendicular to the flow direction increases or decreases along the flow direction, the method comprising the steps of:

measuring a reference temperature of said gas or liquid using said at least one up-stream arranged thermal sensor, heating said gas or liquid using at least one of said at least two heating elements, each heating element being fed with a predetermined electrical power, making a first set of measurements of the temperature of said gas or liquid at one or each down-stream arranged thermal sensor, adjusting the predetermined electrical power to each heating element, making a second set of measurements of the temperature of said gas or liquid at one or each down-stream arranged thermal sensor, calculating a first and second set of mass flow values at each down-stream arranged thermal sensor for said first and said second set of measurements using temperature differences between the temperature at each down-stream arranged thermal sensor and said reference temperature and comparing the temperature differences to a predetermined calibration set, and comparing said first and second set of mass flow values to detect wear or contamination of said at least two heating elements.

* * * * *